United States Patent [19]
Perry

[11] Patent Number: 5,909,575
[45] Date of Patent: Jun. 1, 1999

[54] TECHNIQUE FOR EFFICIENTLY MAINTAINING SYSTEM CONFIGURATION

[75] Inventor: Dewayne E. Perry, Summit, N.J.

[73] Assignee: Lucent Technologies Inc., Murray Hill, N.J.

[21] Appl. No.: 08/846,980

[22] Filed: Apr. 30, 1997

[51] Int. Cl.[6] .................................................. G06F 9/00
[52] U.S. Cl. .......................................... 395/653; 395/712
[58] Field of Search ................................... 395/651, 652, 395/653, 701, 712

[56] References Cited

U.S. PATENT DOCUMENTS

| | | | |
|---|---|---|---|
| 4,558,413 | 12/1985 | Schmidt et al. | 364/300 |
| 5,784,612 | 7/1998 | Crane et al. | 395/653 |
| 5,807,175 | 9/1998 | Davis et al. | 463/36 |
| 5,815,731 | 9/1998 | Doyle et al. | 395/830 |
| 5,835,777 | 11/1998 | Staelin | 395/712 |

Primary Examiner—Dennis M. Butler

[57] ABSTRACT

During a reconfiguration of a software-based system, an addition process for loading software components onto the system is performed, followed by a removal process for purging therefrom those components which are no longer required in the new configuration. In accordance with the invention, the dependencies of the software components currently in the system and those to be added thereto are identified. Using the knowledge of such dependencies, the addition process ensures the minimal addition of software components to the system, and the removal process ensures the maximal removal of software components therefrom in realizing the new configuration.

29 Claims, 2 Drawing Sheets

TECHNIQUE FOR EFFICIENTLY MAINTAINING SYSTEM CONFIGURATION

FIELD OF THE INVENTION

The invention relates to apparatuses and methods for reconfiguring systems, such as software-based systems.

BACKGROUND OF THE INVENTION

Nowadays, a product or service is usually designed according to customer specifications. However, when the customer's needs change, the product or service has to be re-designed to meet the new specifications. Software-based systems have been built to generate a generic set of products or services, each of which may be individualized according to the customer's requirements by dynamically reconfiguring the systems.

To save the system cost, interchangeable hardware components for use in the aforementioned systems are standardized and their interfaces are compatible. In addition, the capacity of the storage for software components in such systems is limited.

Because of the storage space limitation, it is desirable that those software components which are no longer needed after reconfiguring the system are removed therefrom. Moreover, to save time for dynamic reconfiguration, only those software components that are needed but not currently available in the system are loaded thereon. Since no known technique can effectively accomplish these tasks, there thus exists a need for a methodology for efficiently maintaining the system software components during a system reconfiguration.

SUMMARY OF THE INVENTION

I have recognized that the basis for an efficient software reconfiguration of a system is a realization of the dependencies of the software components currently in the system and those to be added thereto. In accordance with an aspect of the invention, when a given software component is to be added to the system, any software components on which the given component depends are identified. That is, any software components, without which the given software component would not function properly in the system, are identified. However, only selected ones of the identified components which currently do not exist in the system are added to the system, along with the given component.

In accordance with another aspect of the invention, when a particular software component is to be removed from the system, a first set of one or more components on which the particular component depends are identified. In addition, a second set of one or more components, on which at least one of the components currently in the system other than the particular component depends, are identified. However, only selected ones of the components in the first set which do not appear in the second set are removed, along with the particular component.

Advantageously, the inventive methodology ensures the minimal addition of software components to the system and the maximal removal of software components therefrom during a system reconfiguration.

BRIEF DESCRIPTION OF THE DRAWING

The present invention will be more fully appreciated by consideration of the following detailed description, when read in light of the accompanying drawing in which.

DETAILED DESCRIPTION

Figure 1:
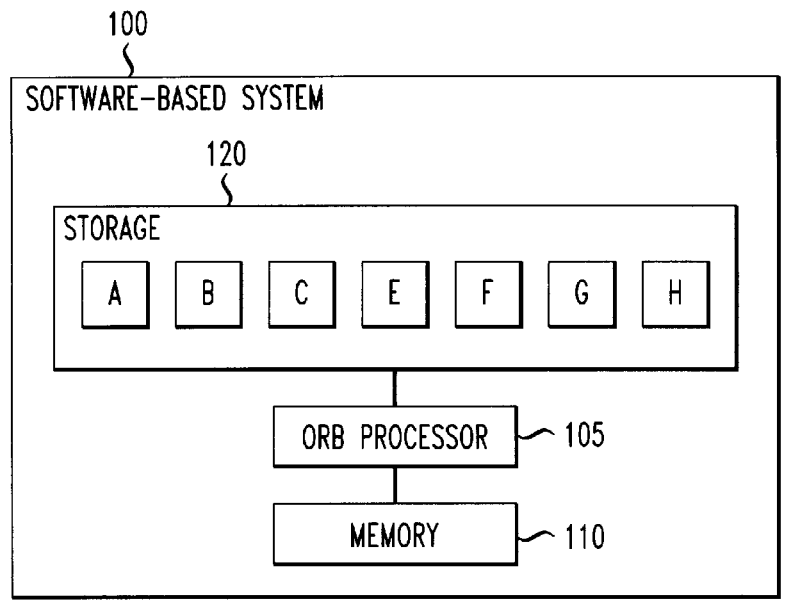
FIG. 1 illustrates a software-based system in accordance with the invention.
Figure 2A:
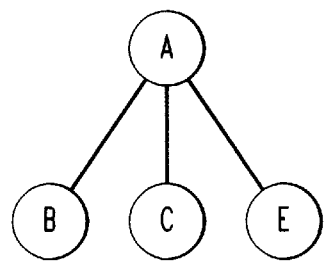
FIGS. 2A, 2B, 2C and 2D are tree graphs depicting dependencies of respective software components in the system of FIG. 1.
Figure 2B:
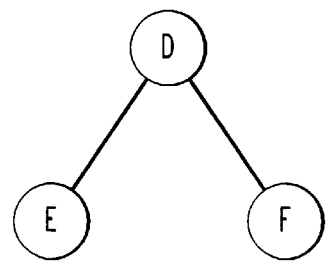
Figure 2C:
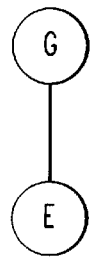
Figure 2D:
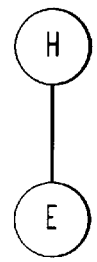

FIG. 1 illustrates software-based system 100 embodying the principles of the invention. System 100 has a generic architecture which can assume different architectural instances for generating a product or service whose specifications change from time to time. In response to one such change, system 100 is reconfigured from one architectural instance to another to account for the new specifications.

Central to system 100 is object request broker (ORB) processor 105 which, in accordance with the invention, provides the necessary substrate for dynamically changing the software configuration of system 100. Specifically, with processor 105, new software components can be dynamically registered to replace those that are no longer needed. In addition, processor 105 acts as an intermediary in the communication among the various software components to realize the dynamic reconfiguration.

As shown in FIG. 1, the current software configuration of system 100 comprises software components A, B, C, E, F, G and H, which are used to control hardware components (not shown) in system 100 to generate the product or service in question. These software components are stored in storage 120, e.g., a conventional hard disk, whose capacity is limited. The reconfiguration routine run by processor 105 to achieve the software reconfiguration in accordance with the invention is stored in memory 110, and fully described hereinbelow. However, it suffices to know for now that this routine includes an addition process for a minimal addition of software components for the reconfiguration, and a removal process for a maximal removal of the components no longer required in the new configuration. The basis for such addition and removal processes is a realization of dependencies of certain software components, which are referred to as "architectural components" and described hereinbelow.

In order to more appreciate the invention, a few terminologies will now be developed. Let the set Comp be a set of all software components that can possibly be needed to support any architectural instance of the generic architecture of system 100. By way of example, Comp={A B C D E F G H I} in this illustration. In other words, using software components A through I, system 100 can realize all architectural instances ever contemplated for the system in this example.

Let the set Dep be a set of ordered 2-tuples each in the form of $(\alpha,\beta)$, signifying that software component $\alpha$ is dependent on software component $\beta$, but not vice versa, where $\alpha \in$ Comp and $\beta \in$ Comp. Thus, Dep is a subset of Comp×Comp representing the dependency of each element in Comp. In this example, Dep={(A,B)(A,C)(A,E)(D,E)(D,F)(G,E)(H,E)}. That is, software components A, D, G and H in this example are dependent on one or more of other components. For that reason, components A, D, G and H are also referred to as the "architectural components" mentioned above, and they form the bases for architectural configurations of system 100 defined below. The set that contains all of the architectural components is referred to as Acomp. In this example, Acomp={A D G H}.

In order for an architectural component to function properly, all of the software components on which the architectural component depends need to coexist therewith in system 100. For example, in order for architectural component A to function properly, software components B, C and E need to coexist with A in system 100. It should be noted that, although not in the above example, an architectural component can also depend on one or more of other architectural components and thus the software components on which they depend.

The dependency of each architectural component can be graphically depicted. FIGS. 2A, 2B, 2C and 2D are tree graphs depicting the dependencies of architectural components A, D, G and H, respectively. In each figure, the root of the tree represents the corresponding architectural component, and each leaf represents a software component on which the architectural component depends.

In addition, let TC(c) be a transitive closure of dependencies defined in Dep beginning with component c, where c ∈AComp. In other words, TC(c) is a set comprising architectural component c itself and an ensemble of all software components on which component c depends as defined in Dep. Referring to FIGS. 2A, 2B, 2C and 2D, in this example TC(A)={A B C E}; TC(D)={D E F}; TC(G)={G E}; and TC(H)={H E}.

Further, an architectural configuration, denoted AC, is defined to be a set $\{ac_1 \ldots ac_n\}$, where $ac_i \in$AComp, $1 \leq i \leq n$, and n is an integer greater than 1. Specifically, each AC corresponds to a respective software configuration. The AC however comprises only architectural components of the corresponding software configuration. Thus, for example, since the current software configuration of system 100 comprises software components A, B, C, E, F, G and H, of which only components A, G, and H are architectural components, the corresponding current AC, denoted Current, is {A G H}. That is, Current={A G H}.

Moreover, BC(AC) denotes a build configuration operation on an AC which forms a union ("U") of the transitive closures of all the elements in the AC. Mathematically, $$BC(AC) = U_{i=1}^{h} TC(ac_i), \qquad [1]$$

where $ac_i \in$AC.

In furtherance of the above example, system 100 at this point needs to be reconfigured in response to a product or service change. The reconfiguration requires that software component D be added to system 100, and at the same time software component A in system 100 is no longer needed and may be removed therefrom, where components A and D in this instance are architectural components as mentioned before. It should be noted at this point that because of the independence of a non-architectural component, e.g., component B, C, E, F or I, a removal or addition of such a component in a reconfiguration in accordance with the invention calls for simply removing only that component from or adding only that component to system 100.

Figure 3:
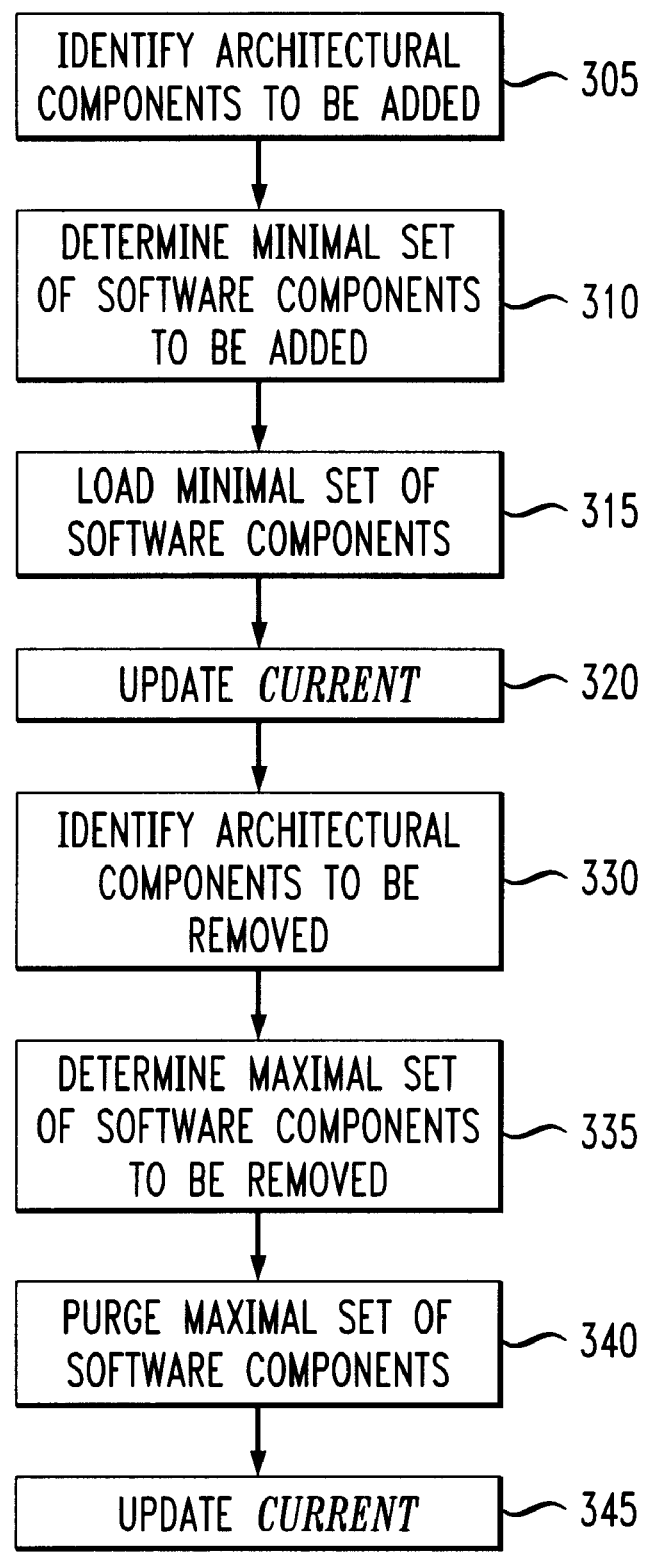
FIG. 3 is a flow chart depicting the steps of a reconfiguration routine run in the system of FIG. 1.

In response to the above reconfiguration involving components A and D, the reconfiguration routine stored in memory 110 is invoked. FIG. 3 is a flow chart depicting the steps in such a routine. Instructed by the reconfiguration routine, processor 105 performs the aforementioned addition process, followed by the removal process, in accordance with the invention.

During such an addition process, component D is added to the current software configuration of system 100. Moreover, any software components on which component D depends are added in order for component D to function properly. However, to save the reconfiguration time, and the space of storage 120, only those components which are currently unavailable in system 100 are loaded thereon. To that end, processor 105 at step 305 identifies an AC containing new architectural components to be added to system 100, which is denoted New. In this instance, New={D}.

At step 310, processor 105 determines the minimal set of software components to be loaded onto system 100, denoted MinimalAdd, in accordance with the following expression:

$$MinimalAdd = BC(New) - BC(Current), \qquad [2]$$

where New and Current are defined above, and "−" is a set operator rendering a set containing elements which appear in the set preceding to the operator, i.e., BC(New), but not in the set following the operator, i.e., BC(Current).

Referring to expression [1], in this instance BC(New)=BC({D})={D E F}, and BC(Current)=BC({A G H})={A B C E G H}. Thus, according to expression [2], MinimalAdd={D F} in this instance. Accordingly, processor 105 causes software components D and F to be loaded into storage 120, as indicated at step 315. Processor 105 then updates Current at step 320 according to the following expression:

$$Current = Current \cup New. \qquad [3]$$

According to expression [3], the updated Current={A D G H}.

To further save the space of storage 120, the above addition process is followed by the aforementioned removal process. In this removal process, processor 105 causes a removal of component A. In addition, any components on which component A depends and which are no longer needed in the new configuration are removed. To that end, processor 105 at step 330 identifies an AC containing architectural components to be removed from system 100, which is denoted Remove. In this instance, Remove={A}.

At step 335, processor 105 determines the maximal set of software components to be removed from system 100, denoted MaximalRemove, in accordance with the following expression:

$$MaximalRemove = BC(Remove) - BC(Current - Remove), \qquad [4]$$

where in this instance Remove={A} and Current={A D G H} as mentioned before.

Referring to expression [1], in this example, BC(Remove)={A B C E}, and BC(Current−Remove)={D E F G H}. Thus, according to expression [4], MaximalRemove={A B C} in this instance. Accordingly, processor 105 causes software components A, B and C to be purged from storage 120 to further save its space, as indicated at step 340. Processor 105 at step 345 updates Current in accordance with the following expression:

$$Current = Current - Remove. \qquad [5]$$

According to expression [5], the updated Current={D G H}.

Thus, during the above reconfiguration, while software components D and F have been added to the software configuration of system 100, software components A, B and C have been removed therefrom. As a result, the new software configuration of system 100 comprises software components D, E, F, G and H.

The foregoing merely illustrates the principles of the invention. It will thus be appreciated that a person skilled in the art will be able to devise numerous other arrangements which embody the principles of the invention and are thus within its spirit and scope.

For example, in the disclosed embodiment the addition process, including steps 305, 310, 315 and 320 of FIG. 3, is followed by the removal process, including steps 330, 335, 340 and 345. However, these two processes are separable. For instance, if one is more concerned about conserving the reconfiguration time than the storage space for software components, only the addition process needs to be performed to realize the new configuration.

In addition, the inventive methodology is illustratively applied to a reconfiguration of software components in the disclosed embodiment. However, such an inventive methodology is applicable to a reconfiguration of hardware components, or hardware components in combination with software components, as well.

Finally, system 100 is disclosed herein having memory 110 and storage 120 as two discrete functional blocks. However, they could equally well be embodied in a single memory.

I claim:

1. Apparatus for effecting a reconfiguration of a system, the system including storage for accommodating a plurality of components therein to realize first system functions, the reconfiguration of the system involving placing at least a first component into the storage and removing at least a second component in the storage therefrom to realize second system functions, the apparatus comprising:

a processor for identifying one or more components on which said at least first component depends;

a comparator for comparing the identified components with the plurality of components in the storage; and an interface for placing into the storage said at least first component and any one or more of said identified components which are different from each of the plurality of components in the storage, and then removing said at least second component from the storage.

2. The apparatus of claim 1 wherein said plurality of components are software components.

3. The apparatus of claim 1 wherein said plurality of components are hardware components.

4. The apparatus of claim 1 wherein said processor includes said comparator and said interface.

5. Apparatus for effecting a reconfiguration of a system, the system including storage for accommodating a plurality of components therein to realize first system functions, the reconfiguration of the system involving placing at least a first component into the storage and removing at least a second component in the storage therefrom to realize second system functions, the apparatus comprising:

a processor for identifying a first ensemble of one or more components on which said at least second component depends, said processor identifying a second ensemble of any components on which one or more of said plurality of components, other than said at least second component, depend; and an interface for placing said at least first component into the storage and then removing from the storage said at least second component and any one or more of the components in the first ensemble which are different from each of the components in the second ensemble.

6. The apparatus of claim 5 wherein said plurality of components are software components.

7. The apparatus of claim 5 wherein said plurality of components are hardware components.

8. The apparatus of claim 5 wherein said processor includes said interface.

9. Apparatus for reconfiguring a system, the system including storage for accommodating a plurality of components therein to realize predetermined system functions, the apparatus comprising:

first means for placing at least a first component into the storage;

second means for identifying one or more components on which the first component depends;

third means for placing into the storage any one or more of the identified components which are different from each of the plurality of components in the storage;

fourth means for removing at least a second component in the storage therefrom, the second component being removed from the storage after the first component being placed thereinto;

fifth means for identifying a first ensemble of one or more components on which the second component depends;

sixth means for identifying a second ensemble of any components on which one or more of the components currently in the storage depend; and seventh means for removing from said system any one or more of the components in the first ensemble which are different from each of the components in the second ensemble.

10. The apparatus of claim 9 wherein said first means includes said third means.

11. The apparatus of claim 9 wherein said second means includes said fifth means and said sixth means.

12. The apparatus of claim 9 wherein said fourth means includes said seventh means.

13. The apparatus of claim 9 wherein said system is capable of generating a product.

14. The apparatus of claim 13 wherein said system is configured in response to a change in the product.

15. The apparatus of claim 9 wherein said system is capable of providing a service.

16. The apparatus of claim 15 wherein said system is configured in response to a change in the service.

17. The apparatus of claim 9 wherein said plurality of components are software components.

18. The apparatus of claim 9 wherein said plurality of components are hardware components.

19. A method implemented in an apparatus for effecting a reconfiguration of a system, the system including storage for accommodating a plurality of components therein to realize first system functions, the reconfiguration of the system involving placing at least a first component into the storage and removing at least a second component in the storage therefrom to realize second system functions, the method comprising:

identifying one or more components on which said at least first component depends;

comparing the identified components with the plurality of components in the storage; and after placing into the storage said at least first component and any one or more of said identified components which are different from each of the plurality of components in the storage, removing said at least second component from the storage.

20. The method of claim 19 wherein said plurality of components are software components.

21. The method of claim 19 wherein said plurality of components are hardware components.

22. A method implemented in an apparatus for effecting a reconfiguration of a system, the system including storage for accommodating a plurality of components therein to realize first system functions, the reconfiguration of the system involving placing at least a first component into the storage and removing at least a second component in the storage therefrom to realize second system functions, the method comprising:

identifying a first ensemble of one or more components on which said at least second component depends;

identifying a second ensemble of any components on which one or more of said plurality of components, other than said at least second component, depend; and after placing said at least first component into the storage, removing from the storage said at least second component and any one or more of the components in the first ensemble which are different from each of the components in the second ensemble.

23. The method of claim 22 wherein said plurality of components are software components.

24. The method of claim 22 wherein said plurality of components are hardware components.

25. A method implemented in an apparatus for reconfiguring a system, the system including storage for accommodating a plurality of components therein to realize predetermined system functions, the method comprising the steps of:

placing at least a first component into the storage;

identifying one or more components on which the first component depends;

placing into the storage any one or more of the identified components which are different from each of the plurality of components in the storage;

after the placing steps, removing at least a second component in the storage therefrom;

identifying a first ensemble of one or more components on which the second component depends;

identifying a second ensemble of any components on which one or more of the components currently in the storage depend; and removing from said system any one or more of the components in the first ensemble which are different from each of the components in the second ensemble.

26. The method of claim 25 wherein said system is capable of generating a product, said method reconfiguring said system in response to a change in the product.

27. The method of claim 25 wherein said system is capable of providing a service, said method reconfiguring said system in response to a change in the service.

28. The method of claim 25 wherein said plurality of components are software components.

29. The method of claim 25 wherein said plurality of components are hardware components.

\* \* \* \* \*